United States Patent

[11] 3,599,072

| [72] | Inventor | Richard B. Becker |
| | | 8534 Ocean View Ave., Whittier, Calif. 90605 |
| [21] | Appl. No. | 863,795 |
| [22] | Filed | Oct. 6, 1969 |
| [45] | Patented | Aug. 10, 1971 |

[54] BATTERY CHARGER REGULATOR CIRCUIT FOR PERIODICALLY SUPPLYING CHARGING CURRENT TO A BATTERY
17 Claims, 1 Drawing Fig.

[52] U.S. Cl. ............................................... 320/31, 320/39
[51] Int. Cl. ......................................... H02j 7/10
[50] Field of Search ........................................... 320/39, 40, 31

[56] References Cited
UNITED STATES PATENTS

| 3,531,706 | 9/1970 | Mullersman | 320/39 |
| 3,098,198 | 7/1963 | Dawkins | 320/31 |
| 3,242,411 | 3/1966 | Lilienfeld | 320/40 |
| 3,300,704 | 1/1967 | McMillen | 320/40 |
| 3,363,162 | 1/1968 | Bawden | 320/TD UX |
| 3,426,264 | 2/1969 | Frysztak | 320/TD UX |
| 3,443,197 | 5/1969 | Raver et al. | 320/SCR |
| 3,477,009 | 11/1969 | Nichols | 320/39 |
| 3,506,903 | 4/1970 | Olson | 320/31 |

Primary Examiner—J. D. Miller
Assistant Examiner—John M. Gunther
Attorney—Dean Sandford ABSTRACT: There is disclosed herein a regulator circuit for use with a power source, such as a battery charger, for efficiently bringing a battery charge up to a proper value and through the gasing point without significant heating of the battery. The circuit employs a semiconductor timing circuit for properly controlling the operation of a series relay, which supplies current from the power source to the battery, upon nearing and reaching full charge. The series relay includes two windings, one responsive to battery voltage, and the other responsive to the timing circuit. The circuit arrangement allows the approach point of full charge to be sensed and causes the relay to switch to a trickle charge. A heavy charge then is periodically, for example every several minutes, applied as the battery reaches full charge, and to continually maintain the full charge. The present regulator brings the battery through the gasing point slowly by applying a continuous heavy charge until the battery nears the full charge value, and the charge is reduced as the full charge is reached and maintained.

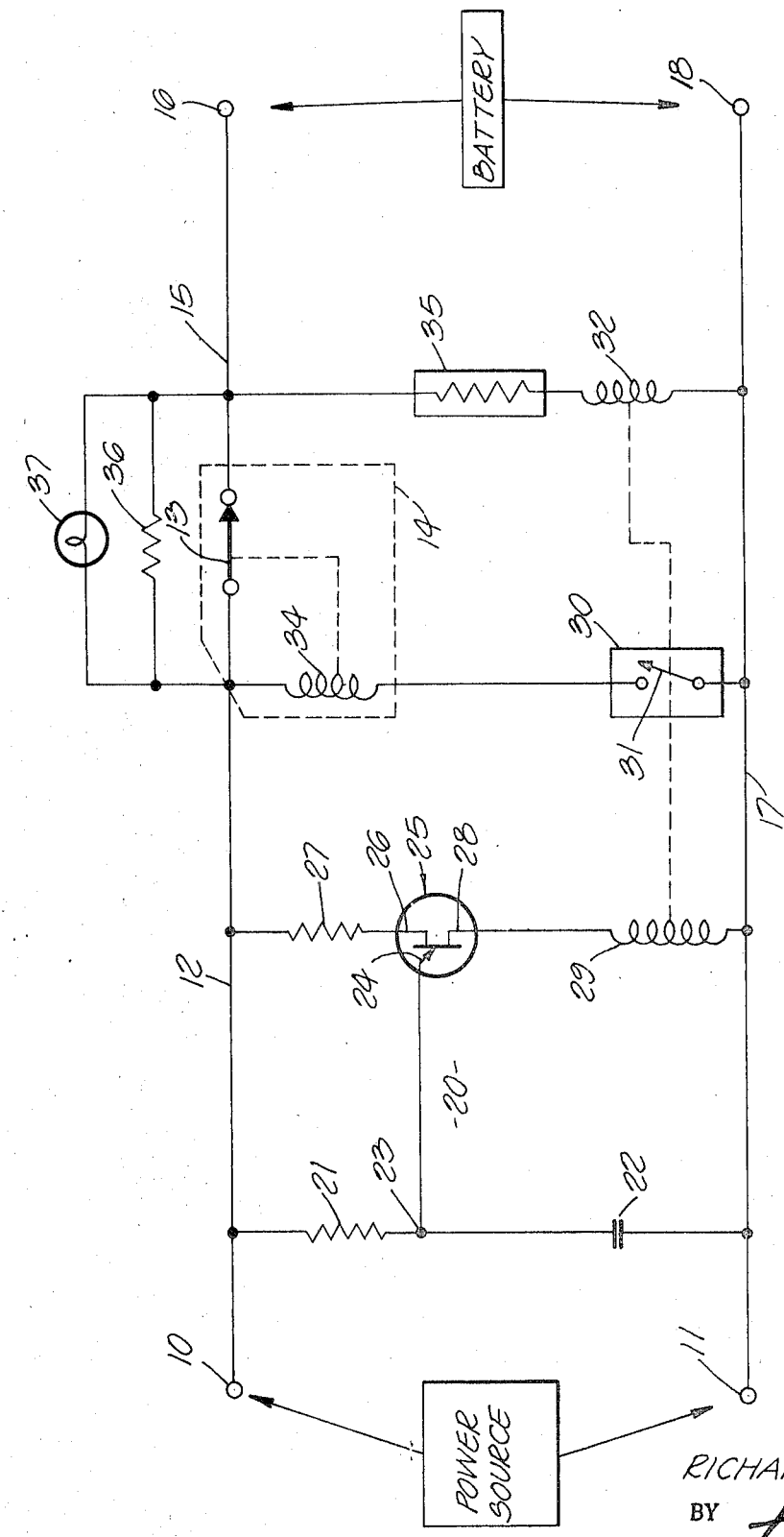

BATTERY CHARGER REGULATOR CIRCUIT FOR PERIODICALLY SUPPLYING CHARGING CURRENT TO A BATTERY

The present invention relates to battery charging, and more particularly to a relatively simple regulator for use between a power source and a battery for properly bringing the battery up to full charge and through the gassing point.

Various types of battery charging devices and regulators therefor have been devised over the years. The typical regulator circuitry employed with battery chargers is relatively costly and complex inasmuch as a number of electromechanical relays and motor operated timer devices usually are employed. Some such chargers continue to charge at a heavy rate rather than tapering down to a low value as the battery approaches a fully charged condition thereby giving rise to gassing and heating problems. Furthermore, some equipment, such as motorcycles, employ relatively crude battery-charging circuits which do not properly maintain the battery charge.

Accordingly, it is a principal object of the present invention to provide a simple, inexpensive and reliable regulator circuit for controlling the charge applied to a battery.

An additional object of this invention is to provide a regulator circuit for use in charging batteries and which brings the battery up to a fully charged condition and through the gassing point thereof in an improved manner.

Another object of this invention is to provide an improved circuit for use with a battery charger for more properly bringing a battery up to a full charge and maintaining the battery in the fully charged condition.

A further object of this invention is to provide a simple and inexpensive regulator circuit for charging a battery.

These and other objects and features of the present invention will become better understood through a consideration of the following description taken in conjunction with the drawing, the single FIGURE of which illustrates a preferred form of regulator circuit according to the concepts of the present invention.

Turning now to the drawing, the same illustrates a circuit including a pair of input terminals 10 and 11 which are adapted to be coupled to a power source, such as a conventional battery charger having a current and voltage output suitable for the battery being charged. For example, a typical charger will have a current output of 4 to 40 amperes, 10 to 25 amperes being typical. A usual voltage output is approximately 14½ volts, but it will be apparent to those skilled in the art that the capacity of the charger is set or selected to be compatible with the requirements of the battery or batteries to be charged. The input terminal 10 is connected to a line 12 which in turn is connected through the contacts 13 of a series relay 14 to an output line 15 and output terminal 16. The input terminal 11 is connected through a line 17 to an output terminal 18, the output terminals 16 and 18 being connected to the terminals of the battery to be charged.

A timing circuit 20 is provided and includes a resistor 21 and capacitor 22 connected in series across the input terminals 10 and 11. The junction 23 of the resistor 21 and capacitor 22 is connected to the emitter 24 of a unijunction transistor 25. The upper base 26 of the transistor 25 is connected through a resistance 27 to the line 12, and the lower base 28 is connected through a coil or winding 29 to the line 17. The winding 29 is one winding of a reed switch 30, the switch contacts thereof being designated by the reference numeral 31. The reed switch 30 includes a second coil or winding 32 which is wound oppositely with respect to the winding 29 in a conventional manner such that current in the winding 29 effectively reduces the flux caused by current in the winding 32.

The contacts 31 of the reed switch 30 are connected in series with a winding 34 of the relay 14 across the lines 12 and 17. The winding 34 operates the series contacts 13 which are normally closed, but are opened when the reed switch 30 energizes the winding 34 as will be explained in greater detail subsequently. A thermistor 35 is connected in series with the second winding 32 of the reed relay 30 across the lines 15 and 17. A resistor 36 is connected across the contacts 13 to provide a trickle charge, and an indicator lamp 37 is connected in parallel with the resistor 36 to indicate when the battery is substantially up to full charge. The thermistor 35 provides temperature compensation over a wide range of temperatures, such as 32° F. to 150° F. Alternatively, the coil 32 can be wound to provide copper temperature compensation in a manner well known to those skilled in the art.

As noted earlier, the regulator circuit of the present invention is used between a power source, such as a battery charger, which is coupled to the input terminals 10 and 11, and a battery which is coupled to the terminals 16 and 18. For purposes of explanation, it is assumed that a 12-volt battery is to be charged and full charge voltage is 14.2 volts. It may also be assumed that the charger supplies 14.8 volts at 10 amperes, automatically reducing to 5 amperes in a conventional manner. First assuming that the voltage of the battery has not reached or substantially approached its full value, the contacts 13 remain closed thereby supplying full current to the battery. This occurs because the contacts 31 of the reed switch 30 remain open because of insufficient flux provided by the second winding 32 to close the contacts 31. The winding 32 and switch 30 are selected to close the contacts 31 when the battery reaches 14.2 volts. Thus, as the battery approaches full charge and reaches 14.2 volts, sufficient current exists in the winding 32 to cause the contacts 31 of the reed switch 30 to close. Closing of the contacts 31 energizes the winding 34 of the relay 14 thereby causing the contacts 13 thereof to open. A trickle charge is then applied through the resistor 36.

As is known, a battery usually reaches its full voltage value before it is actually fully charged. Hence, the battery voltage will drop. Even though the battery voltage drops, the winding 32 still maintains the contacts 31 of the reed switch 30 closed, unless the voltage drops to a very low level such as 7 to 9 volts. However, the timing circuit 20 causes the contacts 31 to open periodically, as is explained below, thereby reestablishing a heavy charge in periodic increments which successively become shorter as full charge is reached.

It first should be noted that the action of the timing circuit 20 has essentially no effect on the initial heavy-charging operation until the contacts 31 of the reed switch 30 are closed by the winding 32, because the winding 29 is substantially smaller than the winding 32 and is wound in opposition thereto. The timing circuit 20 operates to periodically supply a current pulse to the first winding 29 which, because it is wound in opposition to the winding 32, reduces the flux in the reed switch and allows the contacts 31 to open. Once the contacts 31 are opened in this manner, they do not reclose until the battery voltage increases sufficiently (i.e., to 14.2 volts in the present example) to cause the winding 32 to close these contacts.

The timing circuit operates by the capacitor 22 charging through the resistance 21 until the firing point of the transistor 25 is reached. The capacitor 22 then discharges through the first winding 29 of the reed switch 30. This operation occurs periodically, and the rate depends upon the values of the circuit components. Typically, it is desired that the transistor 25 switch on once every 5 to 25 minutes, and it can be assumed to be every 5 minutes for the present example. Thus, the timing circuit oscillates at a slow rate with the transistor 25 turning on and off to provide a short duration pulse through the winding 29. This pulse reduces the flux on the contacts 31 as noted earlier and allows them to open. With the battery not yet at full charge it may be several minutes before its voltage again reaches 14.2 volts, at which point the winding 32 closes the contacts 31, and the contacts 13 open. During this several minute period, a heavy charge is again applied through the contacts 13. The next pulse through the winding 29 again causes the contacts 31 to open and the contacts 13 to close. A heavy charge is again applied, but now for a shorter period of time because the battery will reach 14.2 volts sooner. This cycling operation continues. Even when the battery is fully charged, the winding 29 periodically causes the contacts 31 to open, but only instantaneously since the winding 32 immediately recloses these contacts. The battery is thus brought up to full charge slowly, essentially by increasingly shorter charge pulses, and the electrolyte has a substantially less chance of heating which, in turn, can damage the battery cells.

Thus, a heavy charge is continuously applied until the battery approaches a full charge and the voltage thereof reaches a full value. Then, the charge rate is automatically reduced and the heavy charge is periodically applied as the battery reaches the full charge. Current is periodically applied to the coil 29 by the pulsing action of the transistor 25 which causes the contacts 31 to open and the contacts 13 to close periodically. Conventional systems cause the series contacts, like contacts 13, to open when full charge is reached, and these contacts are caused to close when the battery voltage drops to apply a heavy charge by oscillating the series contacts closed and opened at a fast rate which is detrimental to the battery because of the heating which occurs. On the other hand, the regulator circuit of the present invention applies a periodic heavy and decreasing charge as the battery reaches a full charge, and after being fully charged, only instantaneous charge pulses are applied. This is particularly useful for marine and similar type uses where batteries are charged while the same are coupled to one or more loads, such as a refrigerator. If the battery voltage drops sufficiently as the refrigerator cycles on, the flux from the winding 32 drops, the contacts 31 open and the contacts 13 close again applying a heavy charge to the battery. Even if the flux from winding 32 does not drop sufficiently, pulsing of the coil 29 causes the contacts 13 to close, and the charging action as described above continues with the length of time the contacts 13 remain closed in each cycle being dependent upon the battery charge.

As an example of components which have been found suitable for an exemplary regulator circuit, the resistor 21 may be 2.2 megohms, the capacitor 22, 250 mfd., 25 volts, the resistor 27, 6800 ohms, the transistor 25 a type 2N4891, the switch 30 a Hamlin Reed Switch DRR-1 with winding 29 being 1200 turns of No. 41 wire and winding 32 being 5000 turns of No. 41 wire. The relay 14 may be a Model 2002 relay manufactured by C. & B. Manufacturing Company, Santa Fe Springs, California, the resistor 36, 35 ohms, and the thermistor 35 a type IJ35 sold by Cal-R. Inc., of Los Angeles, California. This arrangement has been used with a conventional charger having a 10-ampere current output and having a voltage output of approximately 14.8 volts for charging 12-volt batteries.

A regulator circuit constructed in accordance with the teachings of the present invention also is particularly useful in charging certain motorcycle batteries. Many motorcycles of foreign manufacture utilize permanent magnet alternators and a very simple control circuit for applying current to the battery. Such circuits generally are not effective and frequently either apply full charge which tapers off in any appropriate manner as the battery reaches a full charge. Accordingly, the present circuit may be used wherein the input terminals are connected with the rectified output of the alternator, and the output terminals connected to the battery of the motorcycle. This arrangement allows for proper and efficient maintenance of the charge, and charging, of the motorcycle battery.

Furthermore, and particularly for motorcycle use, the windings 29 and 32 may comprise the windings for the relay switch 14. The circuit shown in the drawing remains the same in this case, but the switch 30 and winding 34 are not needed, and the windings 29 and 32 directly actuate the contacts 13 to provide the same operation previously described.

The present embodiments of this invention are to be considered in all respects as illustrative and not restrictive.

I claim:

1. A battery-charging circuit adapted for connection between a source of direct-current power and a battery to regulate the flow of charging current to the battery which comprises:

first switch means adapted to be coupled between the power source and a battery to be charged for supplying current to said battery, said first switch means having first and second states and being normally in said first state to supply current to said battery;

first winding means responsive to the voltage of said battery, said first winding means supplying sufficient flux to cause said first switch means to assume its second state interrupting the flow of current to said battery when said battery reaches a predetermined voltage corresponding to the fully charged voltage of the battery;

second winding means adapted to supply flux for causing said first switch means to assume said first state, said first and second winding means being wound in opposition with said first winding means being capable of supplying substantially more flux than said second winding means; and timing circuit means for supplying periodic control current pulses to said second winding means to periodically cause said first switch means to assume said first state, said timing circuit means including control means operating to supply said current pulses.

2. The circuit defined in claim 1 including means connected in parallel with said first switch means to provide a substantially reduced flow of charging current to said battery when said first switch means is in said second state.

3. The circuit defined in claim 1 wherein said first switch means includes a first relay having a switch operable to said first and second states and a winding for causing operation of said switch, said relay winding causing said switch means to assume said second state when said relay winding is energized, and including a second switch means coupled to energize said relay winding, said second switch means being normally open and being responsive to flux supplied by said first and second winding means, said first winding means supplying sufficient flux to close said second switch means and to energize the winding of said first relay when said battery reaches said predetermined voltage and said second winding means periodically causing said second switch means to open by supplying a flux tending to cancel the flux supplied by said first winding means.

4. The circuit defined in claim 1 wherein said control means includes a semiconductor coupled in series with said second winding means, and a storage means comprising capacitance operable to periodically charge to a predetermined value and to cause said semiconductor to supply a current pulse through said second winding means.

5. The circuit defined in claim 4 wherein said semiconductor comprises a unijunction transistor.

6. The circuit defined in claim 3 wherein said control means includes a semiconductor coupled in series with said second winding means, and a storage means comprising capacitance operable to periodically charge to a predetermined value and to cause said semiconductor to supply a current pulse through said second winding means.

7. The circuit defined in claim 6 wherein said semiconductor comprises a unijunction transistor.

8. The circuit defined in claim 11 wherein said power source means is a battery charger.

9. The circuit defined in claim 11 wherein said power source means includes an alternator and rectifier of a portable internal combustion engine apparatus.

10. A battery-charging circuit adapted for connection between a source of direct-current power and a battery to regulate the flow of charging current to the battery, which comprise:

first switch means adapted to connect the power source and a battery to be charged for supplying charging current to said battery;

voltage control means coupled with said first switch means and responsive to the voltage of said battery to actuate said switch means to interrupt the flow of charging current to said battery upon the battery reaching a predetermined voltage corresponding to the fully charged voltage of the battery;

timing means to periodically close said first switch means to supply charging current to said battery until the flow of said charging current is interrupted by said voltage control means upon the battery reaching a voltage corresponding to said predetermined voltage;

and means connected between the power source and said battery for supplying relatively low-amperage charging current to said battery during periods that the flow of high-amperage charging current to said battery is interrupted by said first switch means being in an open position.

11. A battery-charging circuit adapted to be coupled with a battery for charging said battery comprising:

power source means for supplying DC current for charging said battery, said power source means having first and second terminals;

a first relay having a switch operable to first and second states and a winding for causing operation of said switch, said switch being coupled to said first terminal of said power source and adapted to be coupled to a first terminal of a battery to be charged, said switch being normally in said first state to supply current to said battery, and said winding being coupled between said first and second terminals of said power source;

conductor means coupled to said second terminal of said power source and adapted for coupling to a second terminal of a battery to be charged;

a second relay having a switch operable to first and second states and having first and second windings for causing operation of said switch, said switch being connected in series with the winding of said first relay and being normally in the second state whereby the flow of current through the winding of said first relay is interrupted, said first winding being responsive to the voltage of said battery and supplying sufficient flux to cause the switch of said second relay to assume its first closed state when the battery reaches a predetermined voltage corresponding to the fully charged voltage of the battery, said second winding being wound in opposition to said first winding and said first winding being capable of supplying substantially more flux than said second winding, said second winding periodically causing the switch of said second relay to assume its second state by supplying a flux tending to cancel the flux supplied by said first winding whereby the flow of current through the winding of said first relay is interrupted causing the switch of said first relay to periodically assume its first state to supply charging current to the battery; and timing circuit means including a semiconductor coupled in series with said second winding of said second relay and a storage means comprising capacitance operable to periodically charge to a predetermined value and to cause said semiconductor to supply a current pulse through said second winding of said second relay to cause flux to be generated by said winding.

12. The circuit defined in claim 11 wherein said charging current is normally supplied at relatively high amperage, and including a resistor connected in parallel with the switch of said first relay to provide a substantially reduced flow of charging current to said battery when said first relay switch is in said second state.

13. The circuit defined in claim 11 including means operatively associated with said first winding of said second relay to provide temperature compensation.

14. A battery charging circuit adapted to be coupled with a battery for charging said battery comprising:

power source means for supplying DC current for charging said battery, said power source means having first and second terminals;

a first relay having a switch operable to first and second states and first and second windings for causing the operation of said switch, said switch being coupled to said first terminal of said power source and adapted to be coupled to a first terminal of a battery to be charged, said switch being normally in said first state to supply current to said battery, said first winding being responsive to the voltage of said battery and supplying sufficient flux to cause said switch to assume its second state interrupting the flow of current to said battery when said battery reaches a predetermined voltage corresponding to the fully charged voltage of the battery, said first and second windings being wound in opposition with said first winding being capable of supplying substantially more flux than said second winding, said second winding periodically causing said switch to assume its first state by supplying a flux tending to cancel the flux supplied by said first winding;

conductor means coupled to said second terminal of said power source and adapted for coupling to a second terminal of a battery to be charged; and timing circuit means including a semiconductor coupled in series with said second winding and a storage means comprising capacitance operable to periodically charge to a predetermined value and to cause said semiconductor to supply a current pulse through said second winding to cause flux to be generated by said winding.

15. The circuit defined in claim 14 wherein said power source means includes an alternator and rectifier of a portable internal combustion engine apparatus.

16. The circuit defined in claim 14 wherein said charging current is normally supplied at relatively high amperage, and including a resistor connected in parallel with said switch to provide a substantially reduced flow of charging current to said battery when said switch is in said second state.

17. The circuit defined in claim 14 including means operatively associated with said first winding of said relay to provide temperature compensation.